(12) United States Patent
Kohlhepp

(10) Patent No.: US 6,200,096 B1
(45) Date of Patent: Mar. 13, 2001

(54) ACTUATION SYSTEM FOR AN ACTIVE ROTOR CONTROL SYSTEM

(75) Inventor: Fred W. Kohlhepp, Hamden, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 0 days.

(21) Appl. No.: 09/293,428

(22) Filed: Apr. 16, 1999

(51) Int. Cl.$^7$ .................................................. B64C 9/00

(52) U.S. Cl. ............................................ 416/24; 416/158

(58) Field of Search ............................. 416/23, 24, 158; 92/34, 39, 92

(56) References Cited

U.S. PATENT DOCUMENTS

| | | | |
|---|---|---|---|
| 2,625,997 | * | 1/1953 | Doak ...................................... 416/24 |
| 3,020,008 | | 1/1962 | Rumsey ................................. 244/85 |
| 3,089,668 | | 5/1963 | Goodall .................................. 244/12 |
| 3,529,417 | * | 9/1970 | Knight ..................................... 92/34 |
| 4,324,530 | | 4/1982 | Fradenburgh et al. .............. 416/228 |
| 4,464,980 | * | 8/1984 | Yoshida ................................... 92/34 |
| 4,825,754 | | 5/1989 | Devaud et al. ........................ 92/122 |
| 5,320,491 | * | 6/1994 | Coleman et al. ...................... 416/24 |
| 5,409,183 | * | 4/1995 | Gunsallus .......................... 224/17.13 |
| 5,588,800 | | 12/1996 | Charles et al. ......................... 416/24 |
| 5,639,215 | | 6/1997 | Yamakawa et al. .................... 416/23 |
| 5,711,651 | | 1/1998 | Charles et al. ......................... 416/24 |

OTHER PUBLICATIONS

Paper entitled Wind Tunnel Test of an Active Flap Rotor: BVI Noise and Vibration Reduction, Seth Dawson et al., dated May 9–11, 1995, pp. 63–648.

Paper entitled "Higher Harmonic Actuation of Trailing–Edge Flaps for Rotor BVI Noise Control", Bruce Charles et al., dated Jun. 4–6, 1996, pp. 59–79.

Paper entitled "Flight Demonstration of Higher Harmonic Control (HHC) On S–76", W. Miao et al., dated Jun. 2–4, 1986, pp. 777–791.

Abstract entitled Individual Blade Control Project, pp. 1–2, http://halfdome.arc.nasa.gov/~aarweb/research/ibc.html, dated Jul. 2, 1997.

Abstract entitled "Aeroelastic and Dynamic Rotor Response with On–Blade Elevon Control", p. one, http://halfdome.arc.nasa.gov/publications/abstracts/abs14.html, dated approximately Sep., 1998.

Abstract entitled "Hover Testing of a Small–Scale Rotor with On–Blade Elevons", One page, http://halfdome.arc.nasa.gov/publications/abstracts/abs12.html., dated approximately Apr., 1997.

* cited by examiner

*Primary Examiner*—Edward K. Look
*Assistant Examiner*—Ninh Nguyen
(74) *Attorney, Agent, or Firm*—Seidel Gonda Lavorgna & Monaco, PC

(57) ABSTRACT

A flap actuation system for a helicopter rotor blade. The rotor blade includes a root end, a tip end, a trailing edge and a flap hinged to at least a portion of the trailing edge about a pivot axis. The flap actuation system includes at least one supply line mounted within the rotor blade and extending outward from the root end. The supply line is adapted to channel pressurized fluid. At least one actuator fluidly connected to the supply line. The actuator includes a displacement member and a head member. The head member is engaged with the flap and is adapted to pivot the flap about its pivot axis when pressurized fluid is conveyed through the supply line. In one embodiment of the invention there are two supply lines, each extending outward from the root end and is adapted to channel pressurized fluid. There is at least one actuator fluidly connected to each supply line. The actuator on one of the supply lines is adapted to pivot the flap upward when pressurized, and the actuator on the other supply line is adapted to pivot the flap downward when pressurized.

11 Claims, 9 Drawing Sheets

ACTUATION SYSTEM FOR AN ACTIVE ROTOR CONTROL SYSTEM

The Government has rights to the invention pursuant to government in contract N00019-96-C-2079 awarded by the United States Naval Research Laboratory.

FIELD OF THE INVENTION

The present invention relates to an actuator for an aircraft and, more particularly, to an actively controlled actuator for controlling the flap angle in a helicopter rotor blade.

BACKGROUND OF THE INVENTION

Helicopter main rotor lift and rotor driving torque produce reaction forces and moments on the helicopter main gearbox. In addition to the primary flight loads, the aircraft is also subjected to vibratory loads originating from the main rotor system. These vibratory loads produce vibrations and noise within the aircraft that are extremely annoying and fatiguing to the passengers.

One vibratory load that is of particular concern results from the interaction of the rotor blades with blade vortices developed by the preceding blades during rotation. As the rotor blade rotates, the air flows passing over and under the blade combine downstream from the trailing edge creating a vortex. During normal flight modes, the blade vortices do not cause any particular problem. However, in certain instances, for example during rotor deceleration such as when the aircraft is descending, the trailing blade contacts the blade vortex generating an impulsive noise or slap. This contact with the vortex also creates a vibration within the rotor system that transfers into the cabin. These vibrations can be upwards of 5/rev (i.e., 5 times per revolution of the rotor system). The noise and vibrations generated by the blade interaction with the vortices is annoying to the passengers and crew within the helicopter and produces an external noise signature which can be easily detected at long range, increasing the aircraft's vulnerability when in a hostile environment.

Many attempts have been made over the years to alleviate or reduce blade vortex interactions. A considerable amount of those attempts have been directed toward passive type systems wherein the blade is designed to weaken the vortex at the blade tip. See, for example, U.S. Pat. No. 4,324,530 which discloses a rotor blade with an anhedral swept tapered tip which reduces the intensity and shifts the location of the tip trailing edge vortex so as to reduce the occurrence of blade vortex interactions.

While passive solutions have provided some reduction in blade vortex interaction, those solutions also tend to negatively impact the flight characteristics of the rotor blade.

Active rotor control systems have recently been proposed to counteract blade vortex interactions. These systems are typically designed to change the motion of the rotor blade to miss the blade vortex or cut the vortex differently so as to reduce contact with the blade vortex. One of these systems is called higher harmonic blade pitch control wherein the blade pitch is controlled to reduce the vortex at the blade tip. While the reduced blade tip vortex does lead to lower noise from blade vortex interaction, the change in blade pitch also reduces the aerodynamic characteristics for the entire blade.

Another active control system is discussed in U.S. Pat. No. 5,588,800. This active control system is mounted within a helicopter rotor blade and includes actuatable flaps on the rotor that are controlled to reduce the blade vortex interaction. An actuator is used to control the movement of the flaps and can be either mechanical, electrical, pneumatic, or hydraulic. U.S. Pat. No. 5,639,215 discloses a similar actuatable flap assembly. In this assembly, the actuator is a mechanical actuator that is either a push-rod type device, a linkage, or a servo-motor driven rack.

Although the prior art systems for actively controlling the rotor blade interactions with the blade vortex are empirically better than the passive systems described above, these prior art systems do not address the realistic problems associated with mounting an actuation system within a rotor blade to control the flaps in the desired manner.

A need, therefore, exists for an improved actuation system for use in an active rotor control system to control flaps on a rotor blade.

SUMMARY OF THE INVENTION

The present invention is directed to a flap actuation system for a helicopter rotor blade. The rotor blade includes a root end, a tip end, a trailing edge and a flap hinged to at least a portion of the trailing edge about a pivot axis.

The flap actuation system includes at least one supply line mounted within the rotor blade and extending outward from the root end. The supply line is designed to channel pressurized fluid. At least one actuator is fluidly connected to the supply line. The actuator includes a displacement member and a head member. The head member is engaged with the flap and adapted to pivot the flap about its pivot axis when pressurized fluid is conveyed through the supply line.

In one embodiment of the invention there are two supply lines, each extending outward from the root end and adapted to channel pressurized fluid. There is at least one actuator fluidly connected to each supply line. The actuator on one of the supply lines is adapted to pivot the flap upward when pressurized, and the actuator on the other supply line is adapted to pivot the flap downward when pressurized.

In one preferred embodiment of the invention, the actuator includes a bellows which extends outward when pressurized with hydraulic fluid.

The foregoing and other features and advantages of the present invention will become more apparent in light of the following detailed description of the preferred embodiments thereof, as illustrated in the accompanying figures. As will be realized, the invention is capable of modifications in various respects, all without departing from the invention. Accordingly, the drawings and the description are to be regarded as illustrative in nature, and not as restrictive.

BRIEF DESCRIPTION OF THE DRAWINGS

For the purpose of illustrating the invention, the drawings show a form of the invention which is presently preferred. However, it should be understood that this invention is not limited to the precise arrangements and instrumentalities shown in the drawings.

DETAILED DESCRIPTION OF THE PREFERRED EMBODIMENTS

While the invention will be described in connection with one or more preferred embodiments, it will be understood that it is not intended to limit the invention to those embodiments. On the contrary, it is intended that the invention cover all alternatives, modifications and equivalents as may be included within its spirit and scope as defined by the appended claims.

Certain terminology is used herein for convenience only and is not be taken as a limitation on the invention. Particularly, words such as "upper,""lower," "left," "right," "horizontal," "vertical," "upward," and "downward" merely describe the configuration shown in the figures. Indeed, the components may be oriented in any direction and the terminology, therefore, should be understood as encompassing such variations unless specified otherwise.

Figure 1:
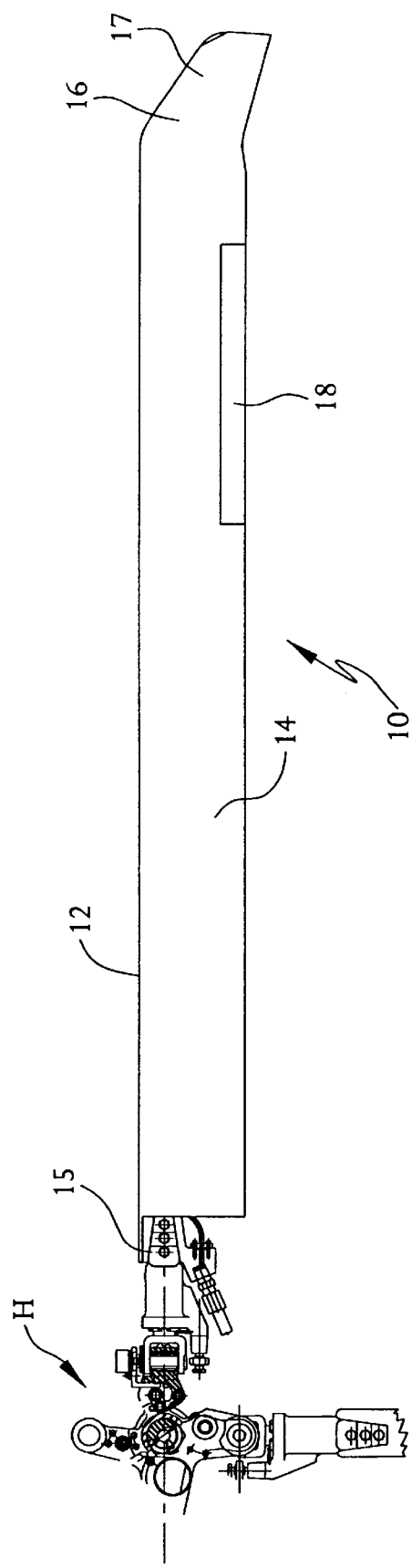
FIG. 1 is a plan view of a helicopter rotor blade incorporating an actuatable flap according to the present invention.

Referring now to the drawings, wherein like reference numerals illustrate corresponding or similar elements throughout the several views, FIG. 1 illustrates a rotor blade 10 for a helicopter. The rotor blade 10 includes a leading edge 12 and a trailing edge 14. The blade 10 is attached at its root end 15 to a helicopter hub H and rotated in conjunction therewith about a rotational axis. The blade 10 includes a tip end 16 which is located at the radially outermost point on the blade. The tip end 16 may include a tip cap 17. At least one flap 18 is mounted to the trailing edge 14 of the blade 10 so as to be articulatable with respect to the trailing edge 14. As shown, the flap 18 may be located within a recess in the trailing edge 14. Alternatively, the flap 18 may be located aft of the trailing edge 14 and extent all or partway along the length of the trailing edge 14. Moreover, there may be several flaps 18 mounted to the rotor blade 10 that can be articulated either independently or concurrently for controlling blade vortex interactions.

Figure 2:
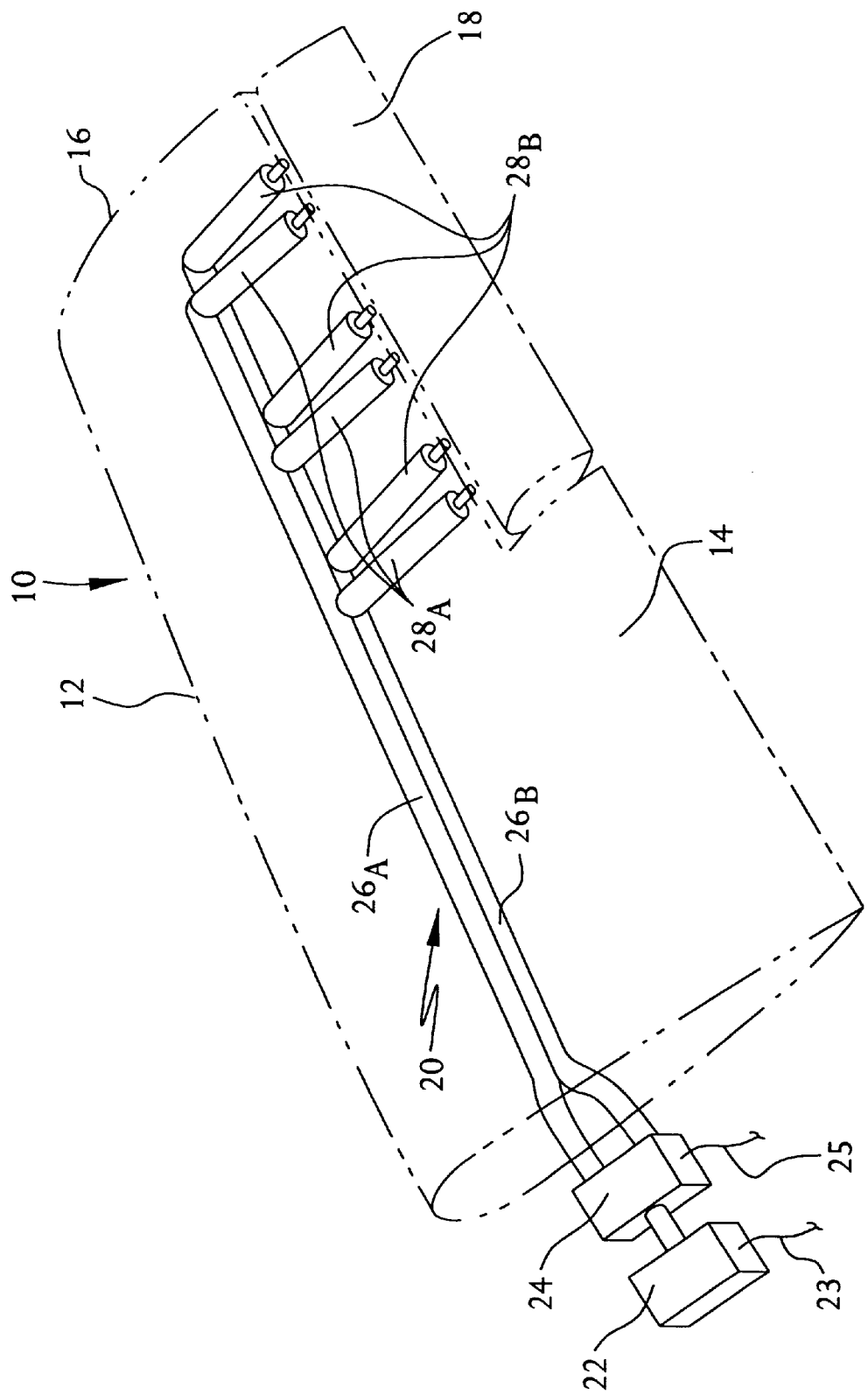
FIG. 2 is a perspective view of a helicopter rotor blade with the blade shown in phantom to illustrate the actuation system according to the present invention.

Referring now to FIG. 2, a partial phantom view of the rotor blade 10 is shown illustrating the actuation system 20 according to one embodiment of the present invention. As discussed above, there have recently been several attempts made at designing an actuation system for controlling flaps on rotor blades. The present invention requires an actuation system that can operate with any rotor system operating at about 2/rev to about 5/rev. The actuation system should be capable of providing flap angular control of about ±10° at approximately 125 cycles/second (Hz) at 5/rev for the scale model. For a full scale rotor blade the cycles would be approximately 21 Hz since a full scale rotor rotates at a slower speed. Furthermore, the actuation system must be capable of providing a sufficient amount of force to overcome the air loads acting on the flap during normal flight. For example, in order to actuate a 69 inch long flap, a torque of 864-in-lbs must be generated to overcome the air loads on the blade.

To meet these design requirements, the present invention incorporates an actuation system 20 that includes a fluid actuator. Other types of systems, such as those disclosed in the prior art, were considered but were determined not to be sufficient for use in a full scale rotor system. For example, although an electromechanical actuator, such as a piezoelectric actuator, could be used to control flap motion, the current devices available on the market would not provide a sufficient amount of deflection (e.g., ±10°) for controlling the flaps. Piezoelectric actuators are also very large and heavy. Thus, electromechanical and mechanical actuators are not preferred.

The actuation system 20 includes a fluid supply 22, which can include, for example, a pump and a fluid source. While a pneumatic system could be used, it is not preferred since air is compressible. Hydraulic fluid is more preferred since its compressibility is less than air and, thus, provides better control over the actuator motion. The fluid supply 22 is shown located externally from the rotor blade 10. Preferably a single fluid supply provides a pressurized fluid medium to the actuation systems 20 located in all the blades 10. The fluid supply 22 is preferably located within the rotor hub H and rotates in conjunction with the rotor blades 10. The fluid supply 22 is connected through an electrical control line to a power source (not shown) and/or a controller (not shown) for controlling the fluid supply 22. The power source and/or controller can be located within the rotor hub or are located within the aircraft with the power and control commands being transferred from the aircraft to the rotating hub through any conventional means, such as a slip ring connection.

The fluid supply 22 provides a flow of fluid to a valve 24. The valve 24 can be mounted within the rotor hub or within the rotor blade 10 itself. The type of valve 24 would be selected depending on the preferred fluid medium. In one embodiment of the invention, the valve is a hydraulic servo valve. Moog, Inc. is one of many manufacturers of hydraulic servo valves suitable for use in the present invention.

The valve 24 is preferably connected through an electrical control line 25 to a power source (not shown) and/or a controller (not shown) for controlling the valve's operation.

The valve 24 is fluidly connected to at least one supply line 26. The supply line 26 provides pressurized fluid for actuating the flap 18. In a more preferred embodiment, there are two fluid supply lines $26_A$, $26_B$, one supply line provides fluid for actuating the flap upward and the second supply line provides fluid for actuating the flap downward. The connection between the valve 24 and the supply lines $26_A$, $26_B$ can be through any conventional means. However, if the valve 24 is mounted within the rotor hub, then the connection with the fluid supply lines $26_A$, $26_B$ should be such that the rotor blade can be easily removed. Hence, the connection should be a removable fluid coupling. The valve 24 controls flow of the fluid medium along the fluid supply lines $26_A$, $26_B$ as will be discussed in more detail below.

The fluid supply lines $26_A$, $26_B$ extend outward through the rotor blade from the root end 15 toward the tip end 16. The fluid supply lines $26_A$, $26_B$ function as conduits for transferring the fluid medium from the valve 24 to one or more actuators $28_A$, $28_B$. The fluid supply lines $26_A$, $26_B$ are preferably made from high strength steel with a thin wall to reduce the weight of the supply lines. The supply lines $26_A$, $26_B$ must still be sufficiently strong to accommodate the internal pressure caused by the fluid medium. During flight, rotation of the rotor head produces a very high centrifugal load on the supply lines $26_A$, $26_B$. This results in an internal pressure that can reach upwards of several thousand psi and higher. For example, in a 1/6th scale test model of the actuation system, the centrifugal loads on the actuation system are approximately 2300 psi. In addition to this high centrifuigal pressure is the fluid pressure that the system 20 must supply to actuate the flaps. This additional pressure is between about 300 psi to about 1400 psi in the scale test model. The supply lines $26_A$, $26_B$ must be capable of withstanding this internal pressure. In the scale test model, the supply lines were made from metal with an outer diameter of approximately 0.156 inches and a thickness of about 0.010 inches. The supply lines $26_A$, $26_B$ are preferably held within the blade with a silicon material, such as RTV sold by Dow Chemical. The silicon permits the supply tubes $26_A$, $26_B$ to move within the blade 10, thus minimizing the transfer of flight loads onto the supply lines.

Figure 3A:
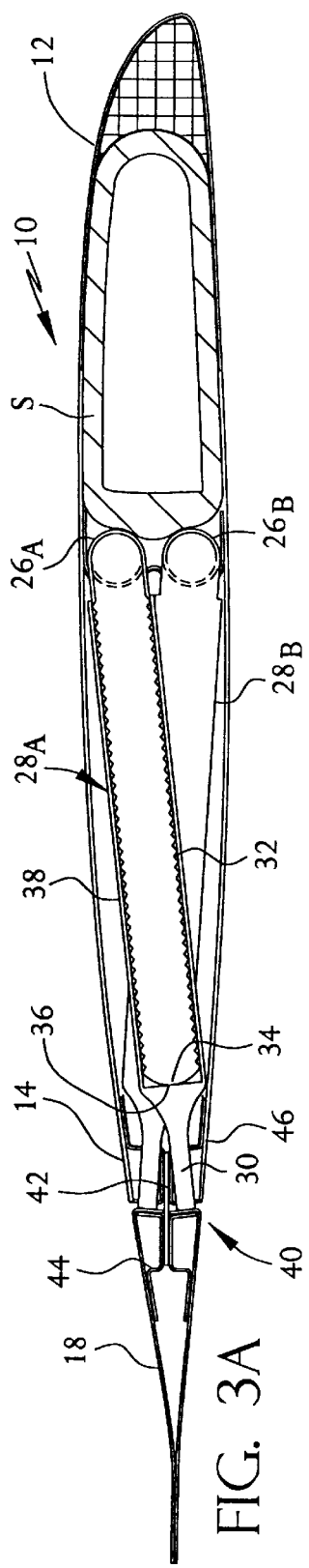
FIG. 3A is a cross-sectional view of a helicopter rotor blade incorporating the actuation system according to the present invention.

The actuators $28_A$, $28_B$ are shown mounted within the rotor blade and are located near and engaged with the flap 18. Referring to FIG. 3A, a cross-sectional view of the rotor blade 10 is shown illustrating one embodiment of the actuators $28_A$, $28_B$ in more detail. As shown, the fluid supply lines $26_A$, $26_B$ are preferably located adjacent to a core or spar S within the rotor blade 10. Although not necessary, it is preferred that all the actuators $28_A$, $28_B$ are similarly constructed. The actuator $28_A$ includes an actuator head 30 which is engaged with a portion of the flap 18. The actuator head 30 can be attached to the flap 18 or may simply be mounted so as to be in contact with the flap 18 such that translation of the actuator head 30 causes the flap 18 to move in a prescribed manner as described in more detail below.

The actuator $28_A$ also includes a displacement member 32 which is engaged with the actuator head 30 for translating the head 30. The displacement member 32 can be attached to, formed integral with or simply in contact against the actuator head 30. The displacement member 32 is controlled by the supply of fluid medium along the fluid supply line $26_A$. In the illustrated embodiment, the displacement member 32 is a hollow bellows which is in fluid communication with the fluid supply line $26_A$. The bellows has a closed end 34 that contacts an inner surface 36 on the actuator head 30. It is also contemplated that the actuator head and the bellows may be integral with one another such that inner surface 36 functions as the closed end of the bellows 32. The closed end 34 of the bellows 32 allows pressure to build up within the bellows 32, forcing it to extend outward. The bellows 32 is designed to provide sufficient translation of the actuator head 30 to move the flap through the desired angular range, which in the preferred embodiment is about ±10°. In order to provide this ±10° of flap motion in the scale test model rotor blade, the bellows provides approximately ±0.010 inches of motion and about 70 pounds of force on the actuator head 30. The bellows is preferably made from nickel material and has a thickness of about 0.0028 inches.

In order to laterally support the bellows 32, the present invention includes a sleeve 38 which is located around the bellows 32 and is preferably formed integral with or attached to the actuator head 30. The bellows 32 is designed to slide within the sleeve 38. The sleeve 38 can be made from any suitable material, such as aluminum, provided that the sleeve has a low stiffness to accommodate blade bending.

While a bellows arrangement is shown and described as one preferred embodiment for actuating the flap, other types of fluid controlled actuators can be substituted into the present invention. For example, the pressurized fluid medium can be supplied to a chamber within which a movable piston is located. The piston can have a piston rod member (actuator head) which is engaged with the flap. As the pressurized fluid fills the chamber, the piston moves the piston rod member producing concomitant movement of the flap.

The flap 18 is hinged to the rotor blade 10 so that the flap 18 can be articulated through the desired angular range (e.g., ±10°). In the illustrated embodiment, a hinge mechanism 40 attaches the flap 18 to the trailing edge 14 of the blade 10. The hinge mechanism 40 provides a means for pivoting the flap 18 with respect to the rotor blade 10. In one embodiment, the hinge mechanism 40 includes a flexible hinge 42 which is preferably a plastic piece of material that is attached to the trailing edge 14 and the flap 18. As the flap is moved with respect to the trailing edge 14, the flexible hinge 42 bends, defining a hinge point. One suitable hinge for use in the present invention is a fabric hinge sold under the trade name Pro Hinge by Radiosouth, Florida. The flexible hinge 42 is mounted to support brackets 44, 46 in the flap 18 and the trailing edge 14. The support brackets 44, 46 are designed to attach the flexible hinge 42 to the flap 18 and trailing edge 14.

While a flexible plastic hinge is the preferred hinge in one embodiment of the invention, other hinges and materials may be used in the present invention. For example, the hinge may be made from a metallic or composite material or may be a conventional two piece pivotable hinge. Hence, the actuator head 30 can be attached to the flap 18 through any conventional means which allows for pivotal movement of the flap 18. Those skilled in the art would readily appreciate the diverse hinge mechanisms that can be used in the present invention.

Figure 3B:
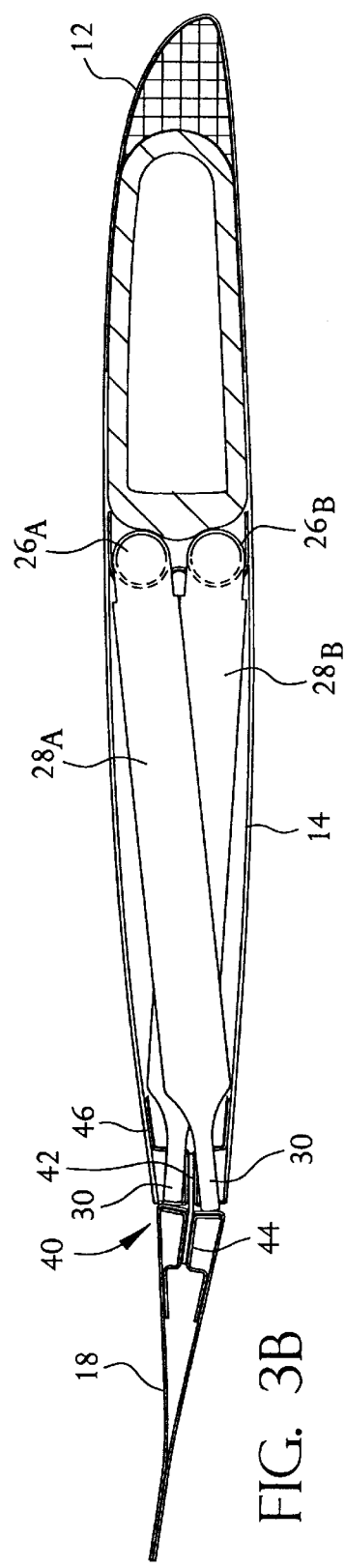
FIG. 3B is a cross-sectional view of the helicopter rotor blade in FIG. 3A illustrating the flap in an upwardly deflected position.
Figure 4:
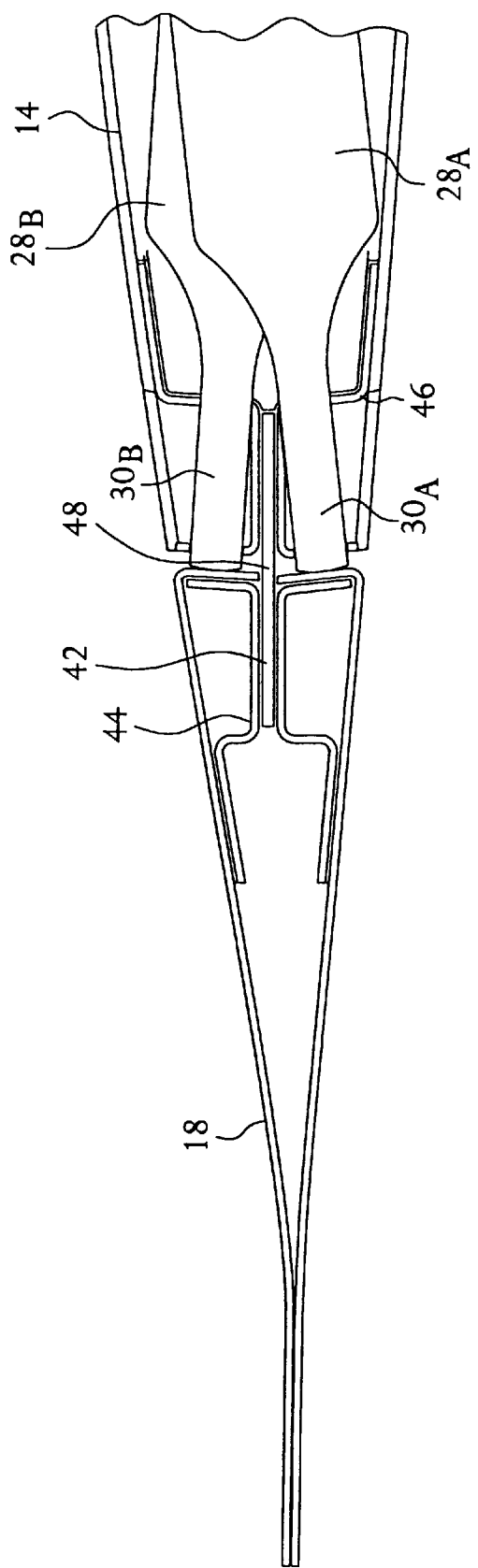
FIG. 4 is an enlarged view of one embodiment of a flap attachment to the trailing edge.

The actuator head 30 of each actuator $28_A$, $28_B$ extends out through holes formed in the trailing edge 14 and contacts the flap 18. More particularly, in the preferred embodiment shown in FIG. 4, wherein there are two fluid supply lines $26_A$, $26_B$ with corresponding actuators $28_A$, $28_B$, the actuator head (which is identified as $30_A$) of the first actuator $28_A$ on the first fluid supply line $26_A$ contacts the flap 18 at a point below a hinge or pivot axis 48 (i.e., the axis about which the flap pivots). The actuator head $30_B$ of the second actuator $28_B$ on the second fluid supply line $26_B$ contacts the flap 18 at a point above the hinge or pivot axis 48. When the first actuator $28_A$ is supplied with pressurized fluid, the actuator head $30_A$ is forced outward toward the flap 18. Since the actuator head $30_A$ contacts the flap 18 below the hinge axis 48, the force imposed on the flap 18 by the actuator head $30_A$ causes the flap 18 to pivot upward as shown in FIG. 3B. At the same time that the first actuator $28_A$ is pressurized, the second actuator $28_B$ is depressurized, allowing fluid to flow out of the second actuator $28_B$ toward the fluid supply 22, this allows the actuator head 30 of the second actuator $28_B$ to move or be moved away from the flap 18.

Figure 3C:
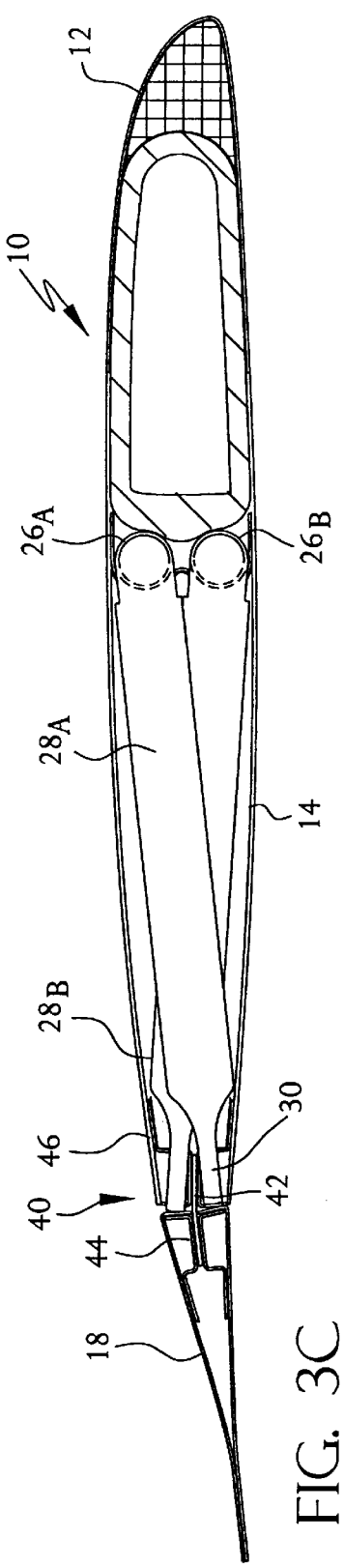
FIG. 3C is a cross-sectional view of the helicopter rotor blade in FIG. 3A illustrating the flap in a downwardly deflected position.

Similarly, when the second actuator $28_B$ is supplied with pressurized fluid, the actuator head $30_B$ is forced outward toward the flap 18. Since the actuator head $30_B$ contacts the flap 18 above the hinge axis 48, the force imposed on the flap 18 by the actuator head $30_B$ causes the flap 18 to pivot downward as shown in FIG. 3C. At the same time that the second actuator $28_B$ is pressurized, the first actuator $28_A$ is depressurized.

It should be noted that if there are several actuators on a supply line connected to a single flap as shown in FIG. 2, then the actuators on each supply line are preferably actuated at the same time. If however, more than one flap is used in the present invention, than pressurized fluid would be sent to the actuators that control the flap that is to be actuated.

It is contemplated that the actuators $28_A$, $28_B$ can be mounted at different radial locations in the blade such that in their non-actuated position the difference in hydrostatic pressure due to centrifugal forces cause the flap 18 to be at a suitable angle to accommodate steady state flight loads. For example, if under normal (steady state) operation it is desirable to have the flap at a +5° angle, the actuators can be mounted such that the flap is at this +5° angle when the actuators are not pressurized. This would minimize air load moments on the actuation system during steady state flight.

Figure 5:
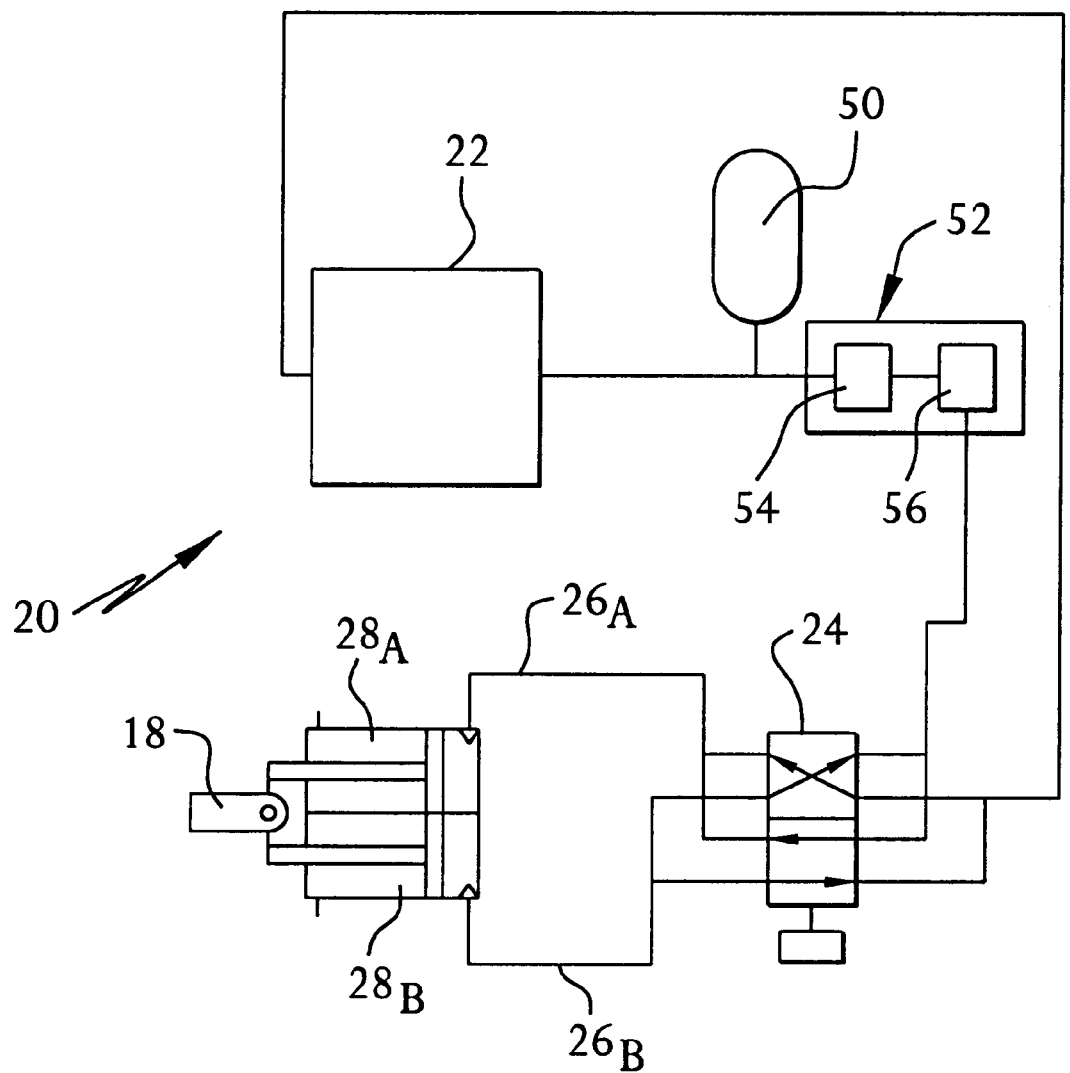
FIG. 5 is a schematic representation of one embodiment of an actuation system according to the present invention.

FIG. 5 is a schematic representation of the actuation control system 20 according to the present invention. An accumulator 50 mounted above the rotor head supplies make-up fluid to a flap position controller 52. The flap position controller 52 incorporates a motor 54 that controls the position of a hydraulic cylinder 56. This hydraulic cylinder 56 is connected to the supply lines 26$_A$, 26$_B$. Motion of the hydraulic cylinder 56 alters the pressure in the supply lines 26$_A$, 26$_B$ and, accordingly, the actuators 28$_A$, 28$_B$ to change the flap position.

The above actuation system provides a novel means for actuating a flap in an active control system for a rotor blade.

In a further aspect of the present invention, the active control system includes a sensing means for detecting the angular position of the flap 18 during operation. The sensed angular position is fed to the controller for accurately controlling the actuation control system 20 and, in particular, the position of the flap 18.

Figure 6:
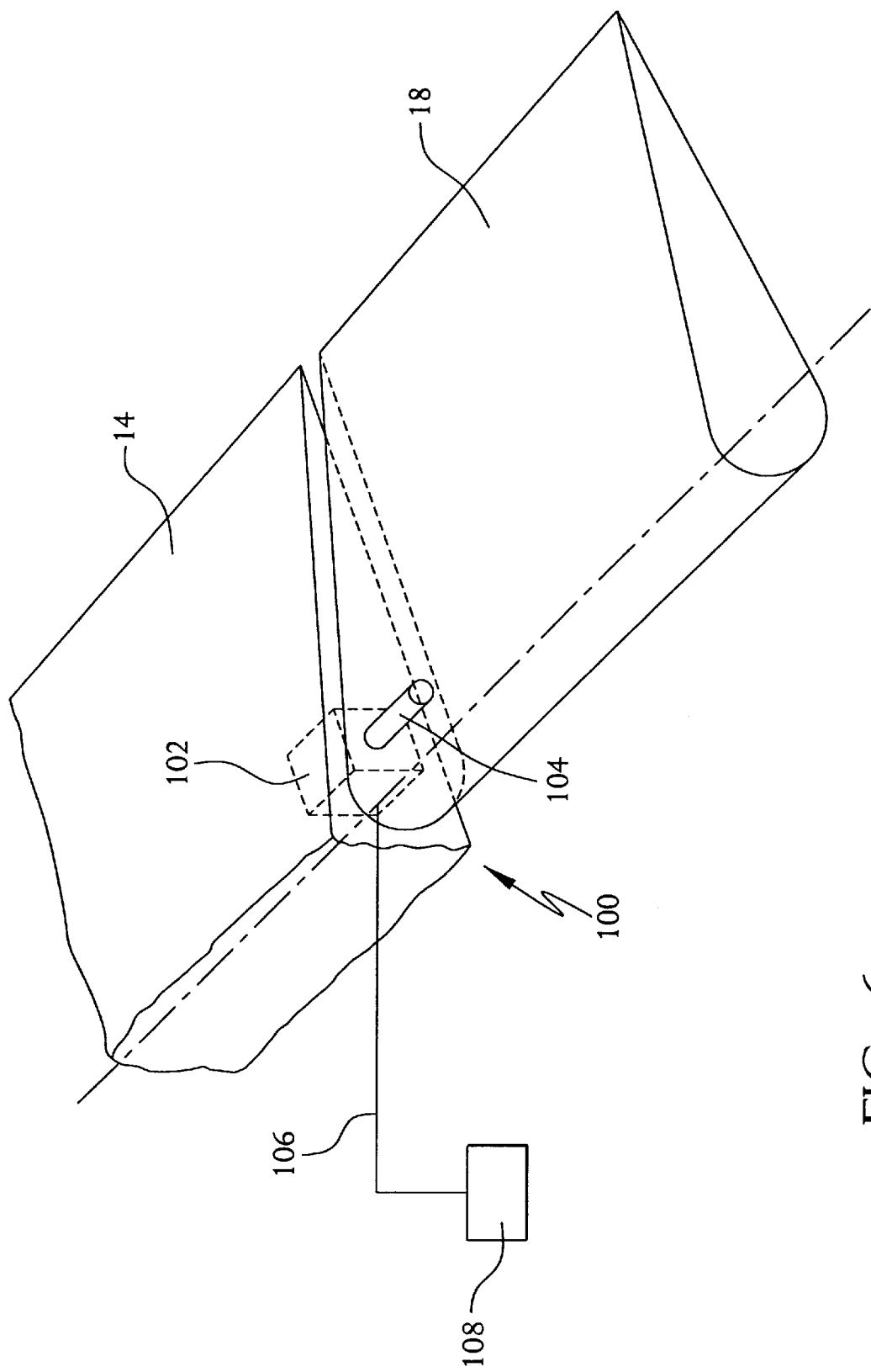
FIG. 6 is a partial perspective view of a flap on a trailing edge illustrating a flap angle measurement device according to one aspect of the present invention.

In one embodiment of the invention, the sensing means monitors or tracks the physical location of the flap 18 with respect to the trailing edge 14. More particularly, referring to FIG. 6, a flap 18 is shown mounted to a portion of a trailing edge 14. The mounting of the flap is such that the flap 18 pivots about a pivot axis 48. A flap angle measurement device 100 is mounted to the flap 18 and the trailing edge 14. The flap angle measurement device 100 includes a Hall effect sensor 102 and a magnetic element 104. The Hall effect sensor 102 is preferably mounted on the trailing edge 14 and the magnet 104 is preferably mounted on the flap 18. The magnet 104 is mounted with its pole axis lying parallel to the sensing surface or face of the Hall effect sensor 102. Electrical lines 106 extend out from the Hall effect sensor 102 and provide electrical communication between the Hall effect sensor 102 and a controller 108 and/or a power source (not shown).

Figure 7:
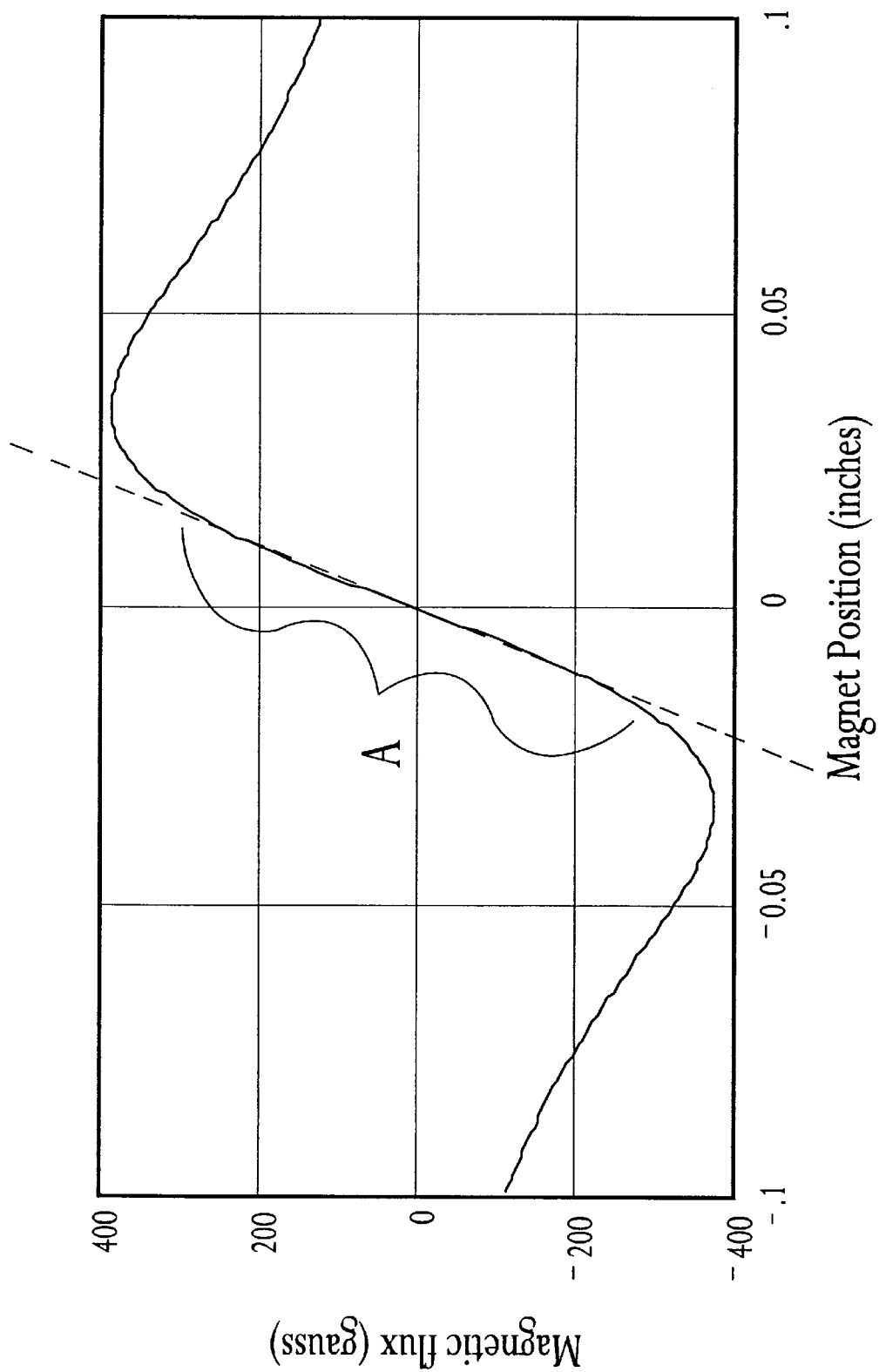
FIG. 7 is a graphical plot of a typical voltage change as sensed by a Hall effect sensor.

Hall effect sensors are well known in the art and generally operate by outputting a voltage which varies based on the density of a magnetic field adjacent to the sensor (normal to the sensor face). Hall effect sensors ignore magnet field components that are parallel to the face of the sensor. See, for example, U.S. Pats. Nos. 4,319,236 and 4,107,604 which are both incorporated herein by reference in their entirety. In the present invention, a voltage is supplied to the Hall effect sensor 102 from the power source or the controller 108. The Hall effect sensor 102 outputs a voltage to the controller 108 that is proportional to the density of the magnetic field parallel to the face of the Hall effect sensor caused by the magnet 104. The density of the magnetic field will vary depending on the location of the magnet 104 with respect to the sensor 102. FIG. 7 is a graphical illustration of a typical voltage change sensed by a Hall effect sensor as the magnetic field moves with respect to the sensor. The x-axis represents the distance from the sensor (from the center of the sensor) that the magnet is located. The y-axis represents the corresponding voltage value at that location. Hence, once the system is calibrated, a sensed voltage can be readily converted to a magnet position.

The range though which an accurate and relatively linear measurement can be achieved is designated by the letter A in FIG. 7. This range varies based on how the device 100 is mounted. More particularly, the further axially away from the sensor that the magnet is located, the wider the width of the range A (i.e., linear range). The maximum distance that the magnet can be moved away from the sensor will depend on the magnet strength and the sensitivity of the sensor. Also, the magnet cannot be mounted too far to the side (laterally) of the hinge axis 48 since the angular motion of the flap may then yield sensed signals outside the linear range A.

Figure 8A:
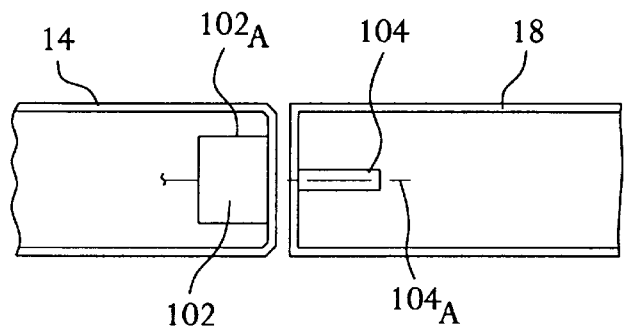
FIGS. 8A–8C illustrate relative positions of a Hall effect sensor and a magnet in a flap angle measurement device during flap actuation.
Figure 8B:
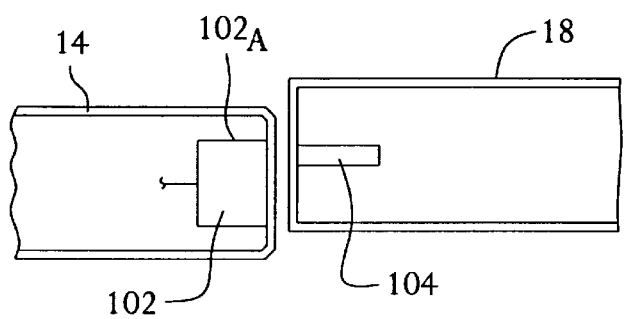
Figure 8C:
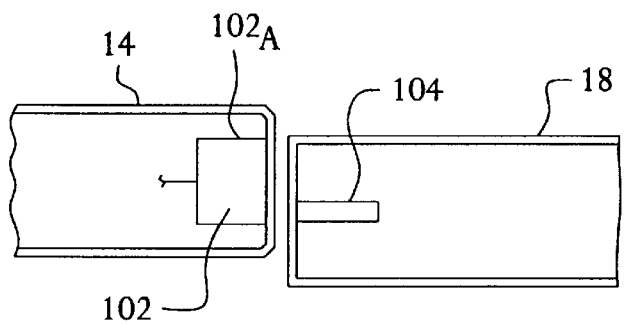

Referring to FIGS. 8A through 8C, the relative position of the magnet 104 with respect to the Hall effect sensor 102 is shown for three exemplary positions of the flap 18. In FIG. 8A, the flap 18 is in a non-deflected position. In this position, the face $^{102}$A of the Hall effect sensor 102 is parallel to the pole axis $^{104}$A of the magnet 104. When the flap 18 is deflected upward, the axis of the magnet 104 is located above the Hall effect sensor 102 (FIG. 8B). When the flap 18 is deflected downward, the axis of the magnet 104 is located below the Hall effect sensor 102 (FIG. 8C). For each position, the Hall effect sensor 102 outputs a different voltage value which can be converted to a flap position. Hence, the Hall effect sensor 102 accurately tracks the position of the flap 18 with respect to the trailing edge 14.

Figure 9:
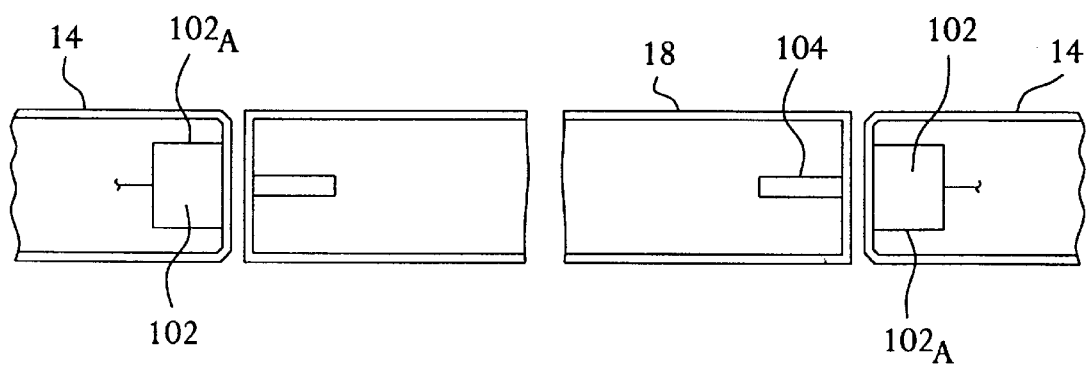
FIG. 9 illustrates an embodiment of the invention in which one Hall effect sensor is mounted on either side of the flap.

A second position sensing device 100 is preferably installed on the other end of the flap and arranged such that the polarity of the output voltage for the second sensor is reversed from the first. This is accomplished by mounting the second Hall sensor with its face facing in the opposite direction from the first Hall effect sensor. FIG. 9 illustrates this embodiment of the invention. By comparing the difference in voltage from both sensors two benefits are achieved. First, the apparent sensitivity of the angle measurement is doubled because the difference in the voltages between the two sensors is twice the magnitude of a single sensor. Second, differences in radial position of the flap are canceled since the flap moves closer to one sensor while moving a corresponding distance away from the other.

One suitable Hall effect sensor for use in the present invention is a HE-503 sensor sold by Cherry Electronics, Waukegan, Ill.

While the above discussion has utilized a position sensing device mounted on the flap and the trailing edge for determining the flap position, it is also contemplated that a position sensor can be mounted adjacent to the actuator for tracking the actuator position. The position of the actuator (i.e., amount of extension) can be used to calculate the flap angle.

Figure 10A:
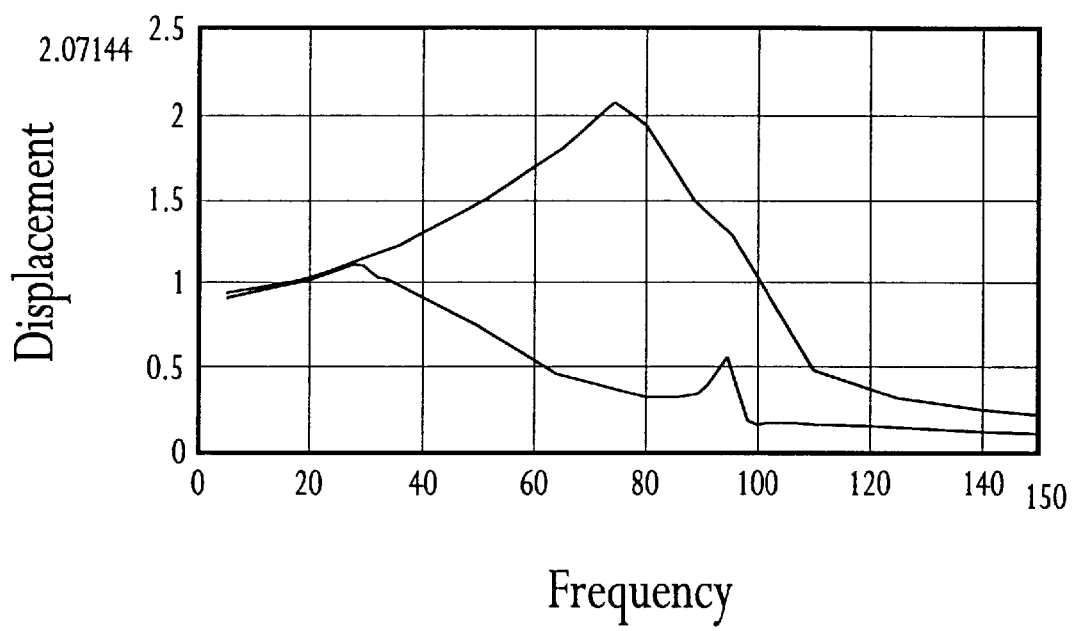
FIGS. 10A and 10B are plotted results comparing measured flap displacement (amplitude and phase) versus commanded flap displacement plotted for different frequencies of flap oscillation.
Figure 10B:
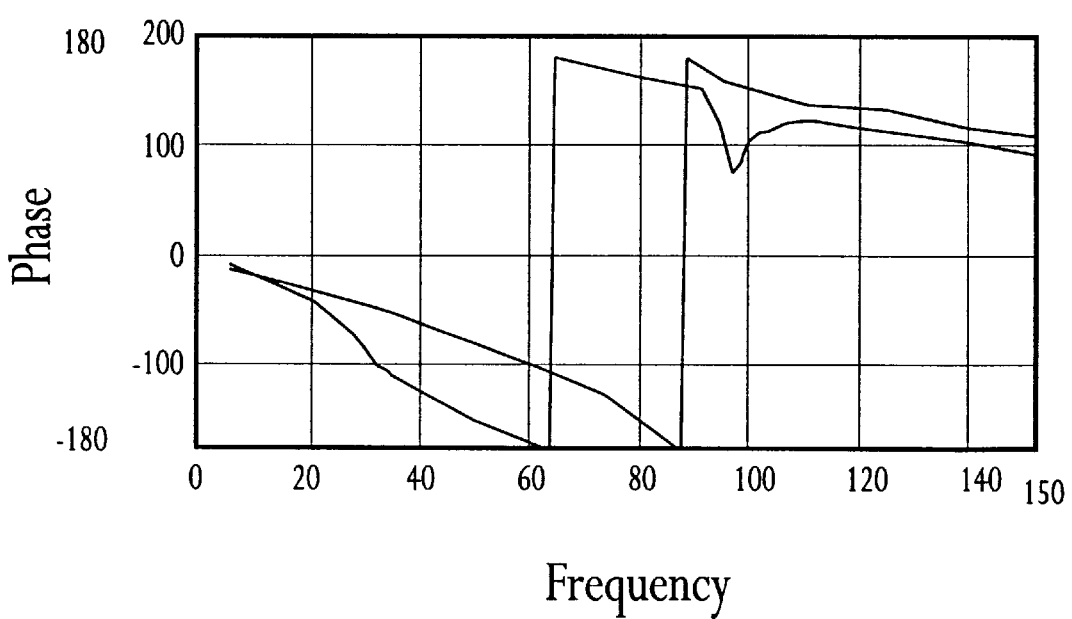

A position sensing device 100 according to the present invention was tested to determine the accuracy of the device. Two Hall effect sensors were mounted on either side of a flap to track the flap position. Servo actuators were utilized to drive the flap through the various angles. FIGS. 10A and 10B illustrate the resulting transfer functions (i.e., difference between commanded value and actual measured value) for the test device. FIG. 10A illustrates the ratio of commanded versus actual angular displacement of the flap from 0° through 2.07° over a frequency range from 1 Hz through 150 Hz. FIG. 10B illustrates the phase difference between the commanded and actual angular displacement over a frequency range from 1 Hz through 150 Hz. The test data shows that a very good correlation can be achieved between commanded versus actual displacements using he present angular position sensing device.

Although the invention has been described and illustrated with respect to the exemplary embodiments thereof, it should be understood by those skilled in the art that the foregoing and various other changes, omissions and additions may be made therein and thereto, without parting from the spirit and scope of the present invention.

What is claimed is:

1. A flap actuation system for a helicopter rotor blade, the rotor blade having a root end, a tip end, a trailing edge and a flap hinged to at least a portion of the trailing edge, the flap being pivotable about a pivot axis, the flap actuation system comprising:

at least one supply line mounted within the rotor blade and extending outward from the root end, the supply line adapted to channel pressurized fluid;

a valve attached to the at least one supply line for controlling a flow of fluid along the supply line;

a controller adapted to receive signals indicative of the current state of the flap, the controller providing a signal to the valve for controlling the operational state of the valve; and at least one actuator fluidly connected to the at least one supply line, the actuator having a displacement member and a head member, the head member being engaged with the flap and adapted to pivot the flap about its pivot axis when pressurized fluid is conveyed through the at least one supply line.

2. A flap actuation system according to claim 1 wherein the displacement member is a bellows which extends outward when supplied with pressurized fluid, and wherein the head member is engaged with the bellows such that extension of the bellows translates the head member in a prescribed direction.

3. A flap actuation system for a helicopter rotor blade, the rotor blade having a root end, a tip end, a trailing edge and a flap hinged to at least a portion of the trailing edge, the flap being pivotable about a pivot axis the flap actuation system comprising:

two supply lines mounted within the rotor blade, each extending outward from the root end and adapted to channel pressurized fluid; and at least one actuator fluidly connected to each supply line, the actuator having a displacement member and a head member, the head member being engaged with the flap and adapted to pivot the flap about its pivot axis when pressurized fluid is conveyed through the associated supply line, and wherein the at least one actuator on one of the supply lines is adapted to pivot the flap upward when pressurized, and the actuator on the other supply line is adapted to pivot the flap downward when pressurized.

4. A flap actuation system according to claim 3 wherein when the first supply line is pressurized, the second supply line is depressurized.

5. A rotor blade for a helicopter comprising:

a root end;

a tip end;

a trailing edge;

a flap hinged to at least a portion of the trailing edge, the flap being pivotable about a pivot axis;

a flap actuation system for pivoting the flap about its pivot axis, the flap actuation system including at least one supply line mounted within the rotor blade and extending outward from the root end, the supply line adapted to channel pressurized fluid;

at least one actuator fluidly connected to the at least one supply line, the actuator having a displacement member and a head member, the head member being engaged with the flap and adapted to pivot the flap about its pivot axis when pressurized fluid is conveyed through the at least one supply line; and a valve attached to the at least one supply line for controlling a flow of fluid along the supply line, the valve being controlled by a controller that receives signals regarding the current operational state of the flap.

6. A rotor blade for a helicopter comprising:

a root end;

a tip end;

a trailing edge;

a flap hinged to at least a portion of the trailing edge, the flap being pivotable about a pivot axis;

wherein the flap is hinged to the trailing edge through a flexible hinge;

a flap actuation system for pivoting the flap about its pivot axis, the flap actuation system including at least one supply line mounted within the rotor blade and extending outward from the root end, the supply line adapted to channel pressurized fluid; and least one actuator fluidly connected to the at least one supply line, the actuator having a displacement member and a head member, the head member being engaged with the flap and adapted to pivot the flap about its pivot axis when pressurized fluid is conveyed through the at least one supply line.

7. A rotor blade according to claim 5 wherein the at least one fluid supply line is engaged with a hydraulic fluid supply which channels pressurized hydraulic fluid to the supply line.

8. A rotor blade according to claim 5 wherein the displacement member is a bellows which extends outward when supplied with pressurized fluid, and wherein the head member is engaged with the bellows such that extension of the bellows translates the head member in a prescribed direction.

9. A rotor blade according to claim 5 wherein there are two supply lines mounted within the rotor blade, each extending outward from the root end and adapted to channel pressurized fluid, wherein there is at least one actuator fluidly connected to each supply line, the actuator having a displacement member and a head member, the head member being engaged with the flap and adapted to pivot the flap about its pivot axis when pressurized fluid is conveyed through the associated supply line, and wherein the at least one actuator on one of the supply lines is adapted to pivot the flap upward when pressurized, and the actuator on the other supply line is adapted to pivot the flap downward when pressurized.

10. A rotor blade according to claim 9 wherein when the first supply line is pressurized, the second supply line is depressurized.

11. A flap actuation system for a helicopter rotor blade, the rotor blade having a root end, a tip end, a trailing edge and a flap hinged to at least a portion of the trailing edge, the flap being pivotable about a pivot axis, the flap actuation system comprising:

a first supply line mounted within the rotor blade and extending outward from the root end, the first supply line adapted to channel pressurized hydraulic;

a first set of actuators fluidly connected to the first supply line, the actuators having a displacement member and a head member, the head member being engaged with the flap and adapted to pivot the flap about its pivot axis so that the flap angles upward when pressurized hydraulic fluid is channeled along the first supply line;

a second supply line mounted within the rotor blade and extending outward from the root end, the second supply line adapted to channel pressurized hydraulic; and a second set of actuators fluidly connected to the second supply line, the actuators having a displacement member and a head member, the head member being engaged with the flap and adapted to pivot the flap about its pivot axis so that the flap angles downward when pressurized hydraulic fluid is channeled along the second supply line.

* * * * *